US009073196B2

(12) United States Patent
Numata

(10) Patent No.: US 9,073,196 B2
(45) Date of Patent: Jul. 7, 2015

(54) ELECTRIC TOOL WITH C-SHAPED TORQUE TRANSMISSION MEMBER

(75) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 762 days.

(21) Appl. No.: 13/146,329

(22) PCT Filed: Jan. 14, 2010

(86) PCT No.: PCT/JP2010/050315
§ 371 (c)(1),
(2), (4) Date: Aug. 9, 2011

(87) PCT Pub. No.: WO2010/090057
PCT Pub. Date: Aug. 12, 2010

(65) Prior Publication Data

US 2011/0297410 A1 Dec. 8, 2011

(30) Foreign Application Priority Data

Feb. 9, 2009 (JP) ................................ 2009-027409

(51) Int. Cl.
*B24B 23/00* (2006.01)
*B25F 5/00* (2006.01)
(Continued)

(52) U.S. Cl.
CPC ................. *B25F 5/006* (2013.01); *B25F 5/001* (2013.01)

(58) Field of Classification Search
CPC ......... E01C 19/35; E01C 19/40; E01C 23/08; E01C 23/085; B25F 5/006; B24B 23/00; F16D 3/12; F16D 3/56
USPC .............................................. 173/217, 162.1
See application file for complete search history.

(56) References Cited

U.S. PATENT DOCUMENTS 3,999,426 A * 12/1976 Sonderegger .............. 73/862.08
4,880,318 A * 11/1989 Shibahara et al. ............ 384/125

(Continued)

FOREIGN PATENT DOCUMENTS

DE 10 2006 001 985 A1 7/2007
EP 1 712 333 A1 10/2006

(Continued)

OTHER PUBLICATIONS

Extended European Search Report issued in European Application No. 10738396.0 mailed Nov. 8, 2013.

(Continued)

*Primary Examiner* — Thanh Truong
*Assistant Examiner* — Praachi M Pathak
(74) *Attorney, Agent, or Firm* — Oliff PLC

(57) ABSTRACT

In an electric disc grinder, there is provided, between a driven gear and a spindle in a torque transmission system, a C-shaped spring member capable of elastic deformation in a diameter enlarging direction. With respect to the rotating direction, the spring member is engaged with a driving protrusion of the driven gear and a driven protrusion of a joint sleeve of the spindle; when transmitting the rotation of the driven gear to the spindle, the spring member undergoes elastic deformation in the diameter enlarging direction depending on the driven side load, thereby mitigating the starting shock. An abutment surface of the driven protrusion is formed as an inclined surface causing an end portion of the spring member contacting with the abutment surface to slide radially outwards. As a result, the spring member can easily undergo elastic deformation in the diameter enlarging direction.

19 Claims, 6 Drawing Sheets

(51) Int. Cl.

| | |
|---|---|
| ***F16D 3/12*** | (2006.01) |
| ***F16D 3/56*** | (2006.01) |

(56) References Cited

U.S. PATENT DOCUMENTS

| | | | | |
|---|---|---|---|---|
| 4,913,242 | A | 4/1990 | Lo | |
| 5,722,894 | A | 3/1998 | Kojima | |
| 7,438,140 | B2 * | 10/2008 | Sterling et al. | 173/162.1 |
| 2002/0098938 | A1 | 7/2002 | Milbourne et al. | |
| 2006/0225903 | A1 * | 10/2006 | Sterling et al. | 173/104 |
| 2007/0187125 | A1 * | 8/2007 | Sterling et al. | 173/162.1 |

FOREIGN PATENT DOCUMENTS

| | | |
|---|---|---|
| JP | A-8-200388 | 8/1996 |
| JP | A-11-247882 | 9/1999 |
| JP | A-2002-264031 | 9/2002 |

OTHER PUBLICATIONS

International Search Report dated Feb. 9, 2010 in International Application No. PCT/JP2010/050315 (with translation).

Nov. 3, 2014 Office Action issued in European Application No. 10 738 396.0.

* cited by examiner

ELECTRIC TOOL WITH C-SHAPED TORQUE TRANSMISSION MEMBER

TECHNICAL FIELD

The present invention relates to an electric tool, such as an electric disc grinder, an electric screwdriver, or an electric drill, and, more specifically, to a torque transmission technique for transmitting torque of an electric motor to an end tool.

BACKGROUND ART

Conventionally, in an electric tool, torque of an electric motor is transmitted to an end tool constituting a driven object via a gear mechanism. In the case of such an electric tool, when the electric motor is started, a shock called starting shock is produced. To eliminate this starting shock, in an electric tool, a C-shaped torque transmission member capable of radial elastic deformation is provided between two rotary members in a torque transmission system (See, for example, Japanese Laid-Open Patent Publication No. 2002-264031). When transmitting the rotation of one rotary member to the other rotary member, the torque transmission member undergoes elastic deformation in a radially outward direction so-called diameter enlarging direction depending on the load on the driven side, so that the starting shock is mitigated, and the electric tool is improved in terms of durability and feel of use.

In the above-described conventional electric tool, the end portions of the torque transmission member and abutment surfaces of the rotary members for contacting with the end portions are brought to contact with each other in a face-to-face contact state. As a result, the torque transmission member does not easily undergo elastic deformation in the diameter enlarging direction, making it difficult to mitigate the starting shock in a stable manner.

Therefore, there is a need in the art for an electric tool capable of mitigating the starting shock in a stable manner.

SUMMARY OF THE INVENTION

In an electric tool according to a first aspect of the invention, a C-shaped torque transmission member undergoes elastic deformation between two rotary members at the start of an electric motor, whereby the starting shock is mitigated, making it possible to improve the electric tool in terms of durability and feel of use. When an end portion of the torque transmission member and an abutment surface of the rotary member contact with each other, because of the abutment surface formed as an inclined surface, the end portion of the torque transmission member slides radially on the abutment surface, and therefore, the torque transmission member can easily undergo elastic deformation. For this reason, it is possible to mitigate the starting shock in a stable manner.

In an electric tool according to a second aspect of the invention, the size of a radial clearance between the elastic deformation side circumferential surface of the torque transmission member in a non-loaded state and the circumferential surface of the rotary member opposed to that circumferential surface is set to 1 to 5% of the diameter of the circumferential surface of the rotary member. Therefore, it is possible to prevent deterioration in the durability of the torque transmission member due to excessive elastic deformation without impairing the starting shock mitigating effect given by the torque transmission member.

In an electric tool according to a third aspect of the invention, it is possible to stabilize the position of the torque transmission member due to a guide member disposed between the circumferential surface of the torque transmission member on the side opposite to the elastic deformation side thereof and the circumferential surface of the rotary members opposed to that circumferential surface. In addition, the guide member is made of a synthetic resin member having a low friction property, so that it is possible to improve the sliding property for sliding contact of the torque transmission member with the guide member.

DETAILED DESCRIPTION OF THE INVENTION

Embodiments

Figure 1:
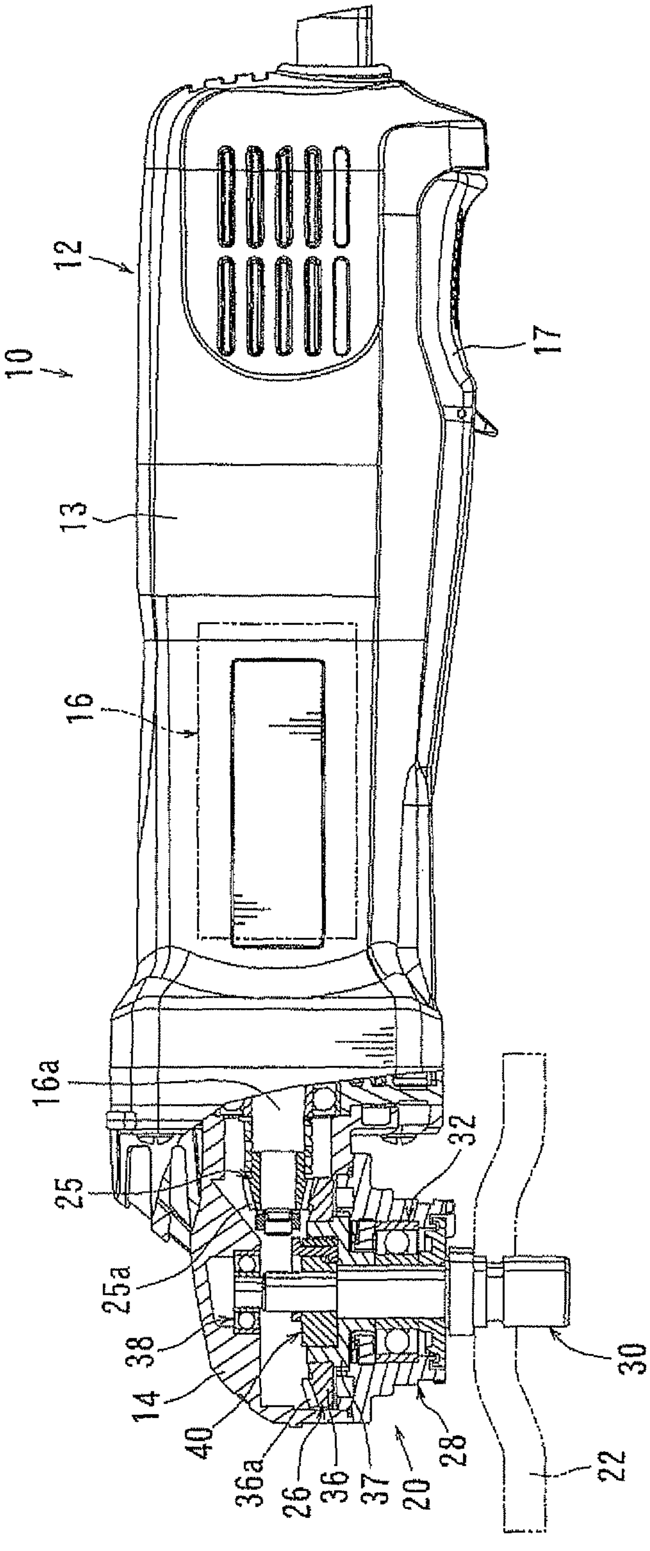
FIG. 1 A side view, partly in section, of an electric disc grinder according to an embodiment of the present invention.

An embodiment of the present invention will be described. In the present embodiment described below, as an electric tool in which an end tool serving as a driven object rotates, a hand-held type electric disc grinder used in a grinding operation or a polishing operation for a material to be machined, such as metal, concrete, or stone, etc., is exemplified. For the sake of convenience in illustration, an outline of the electric disc grinder will be described first, and then a buffer mechanism, which constitutes a main portion thereof, will be described. FIG. 1 is a side view, partly in section, of the electric disc grinder. As shown in FIG. 1, a main body 12 of an electric disc grinder 10 has a motor housing 13 constituting a principal portion thereof, and a gear housing 14 provided at the front end portion (the left end portion in FIG. 1) of the motor housing 13. An electric motor 16 is accommodated within the motor housing 13. A switch lever 17 is provided on the lower side of the motor housing 13. By upwardly pressing the switch lever 17, the electric motor 16 is started, and, by releasing the switch lever 17, the electric motor 16 is stopped, and the switch lever 17 is returned to the original position by a return spring (not shown). Further, the electric motor 16 has an output shaft **16*a* protruding forwards (to the left as seen in FIG. 1). The rotating direction of the output shaft 16*a* of the electric motor 16** is fixed to one direction.

Figure 2:
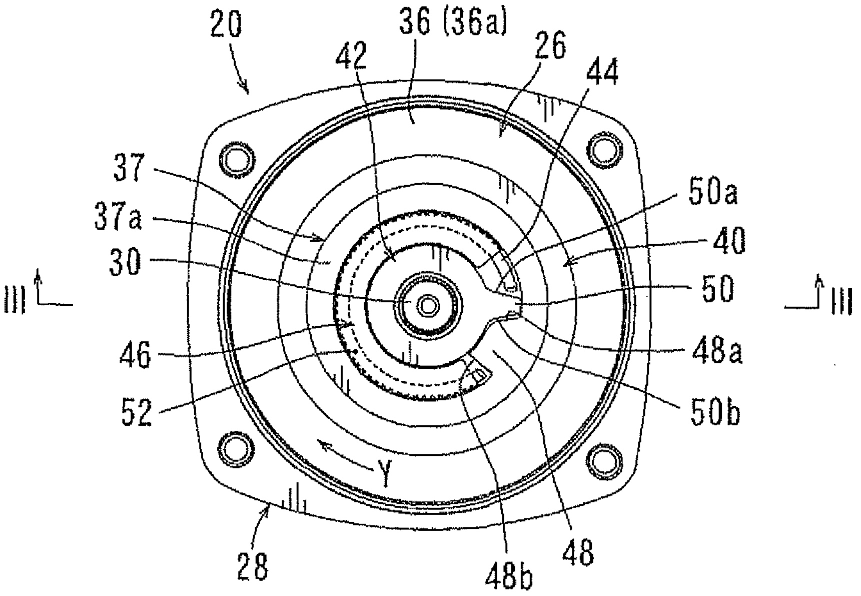
FIG. 2 A top view of a power transmission device.
Figure 3:
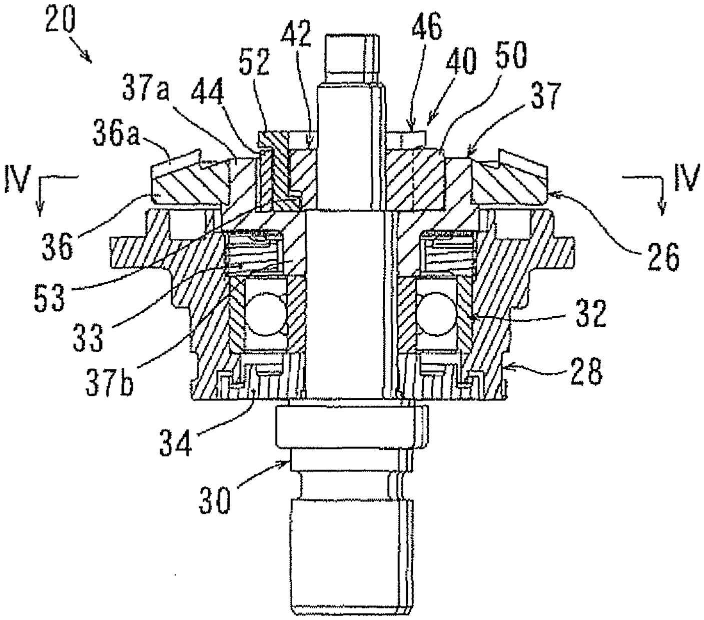
FIG. 3 A sectional view taken along arrow line in FIG. 2.
Figure 4:
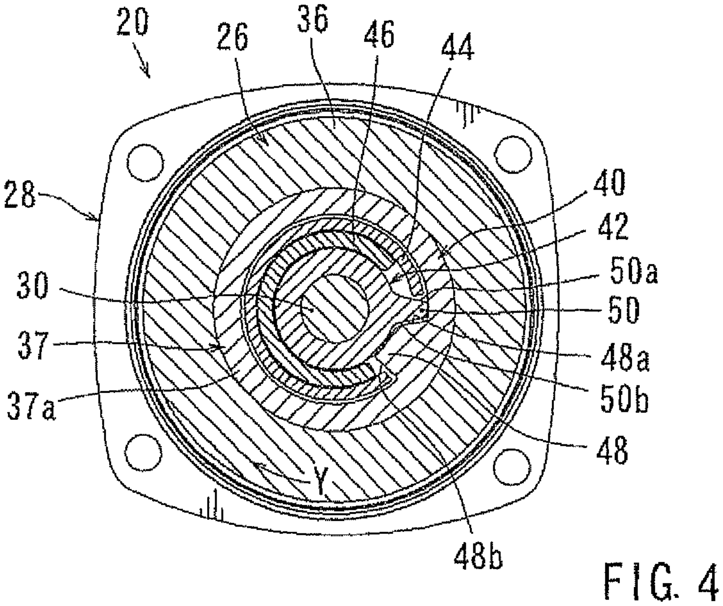
FIG. 4 A sectional view taken along arrow line IV-IV in FIG. 3.

The gear housing 14 defines an accommodation space communicating with a front opening of the motor housing 13 and open downwards. A power transmission device 20 is mounted to the gear housing 14 in a manner to close its lower opening. The power transmission device 20 transmits the torque of the electric motor 16 to a grinding wheel 22 as the end tool. A gear mechanism is provided between the electric motor 16 and the power transmission device 20. The gear mechanism is constituted by a driving side spiral bevel gear (hereinafter referred to as the “drive gear”) 25 mounted to the output shaft 16*a* of the electric motor 16, and a driven side spiral bevel gear (hereinafter referred to as the “driven gear”) 26 in mesh with the drive gear 25. FIG. 2 is a top view of the power transmission device, FIG. 3 is a sectional view taken along arrow line III-III in FIG. 2, and FIG. 4 is a sectional view taken along arrow line IV-IV in FIG. 3. Through the rotation of the drive gear 25, the driven gear 26 is rotated in a right-hand turning direction in plan view (in the direction of arrow Y in FIG. 2).

As shown in FIG. 3, the power transmission device 20 has the driven gear 26, a bearing box 28, a spindle 30, etc. The bearing box 28 is made, for example, of metal (aluminum alloy) and formed in a vertical cylindrical configuration. The spindle 30 is made, for example, of metal (iron), and is rotatably supported in the bearing box 28 via a bearing 32. Further, mounted within the bearing box 28 are an upper side end plate 33 and a lower side end plate 34, which are of a ring-like configuration and configured to hold the bearing 32 therebetween. The driven gear 26 is rotatably mounted to a protruding shaft portion of the spindle 30 protruding upwardly from a hollow hole of the upper side end plate 33. The driven gear 26 is constituted by a gear main body 36 serving as a principal portion thereof, and a coupling 37 integrated with the gear main body 36. The gear main body 36 is made, for example, of metal (iron), in a ring-like configuration, with spiral bevel gear teeth 36*a* being formed on the upper surface side thereof. The coupling 37 is made, for example, of metal (iron) and is formed into a stepped cylindrical shape whose upper half is determined as a large diameter cylindrical portion 37*a* and whose lower half is determined as a small diameter cylindrical portion 37*b*. The large diameter cylindrical portion 37*a* is press-fitted into the hollow hole of the gear main body 36 from below, whereby the gear main body 36 and the coupling 37 are integrated with each other. The small diameter cylindrical portion 37*b* is rotatably supported by the spindle 30. Further, the small diameter cylindrical portion 37*b* is loosely inserted into the hollow hole of the upper side end plate 33, and slidably contacts with the upper end surface of an inner race of the bearing 32. Further, between the driven gear 26 (more specifically, the coupling 37) and the spindle 30, there is provided a buffer mechanism 40 (described below) capable of transmitting torque and serving to mitigate the starting shock.

As shown in FIG. 1, the power transmission device 20 is assembled with the gear housing 14 by connecting the bearing box 28 to the gear housing 14 from below. At the same time, the driven gear 26 (more specifically, the spiral bevel gear teeth 36*a* of the gear main body 36) is brought into mesh with the drive gear 25 (more specifically, the spiral bevel gear teeth 25*a*). Further, the upper end portion of the spindle 30 is rotatably supported by the ceiling portion of the gear housing 14 via a bearing 38. Further, by a well-known mounting structure (not shown) the grinding wheel 22 is detachably mounted to the protruding shaft portion of the spindle 30 that downwardly protrudes from the hollow hole of the upper side end plate 33. The “torque transmission system” as referred to in this specification is constituted by the drive gear 25, the driven gear 26, the spindle 30, the buffer mechanism 40, etc.

The operation of the electric disc grinder 10 will be described. When the electric motor 16 is started (driven) through the operation of the switch lever 17, the output shaft 16*a* rotates, whereby the spindle 30 and the grinding wheel 22 are rotated via the drive gear 25, the driven gear 26, and the buffer mechanism 40. The starting shock generated when starting the electric motor 16 can be absorbed or relieved through mitigation by the buffer mechanism 40 described below.

Figure 5:
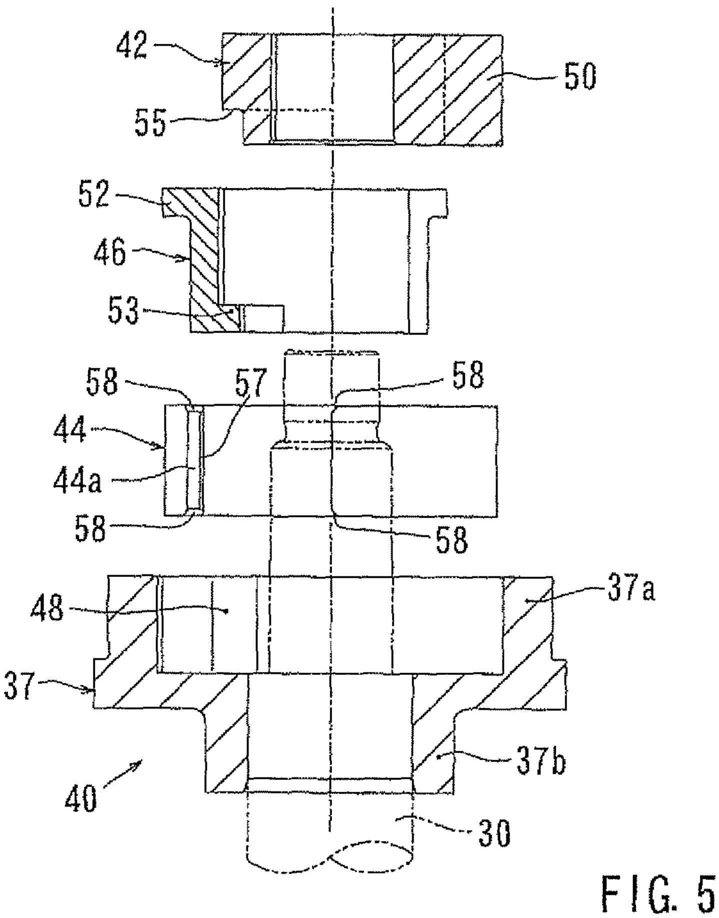
FIG. 5 An exploded sectional view, partly in section, of components of a buffer mechanism.

The buffer mechanism 40 will be described. As shown in FIG. 3, the buffer mechanism 40 is constituted to have the coupling 37, a joint sleeve 42 provided on the spindle 30, a C-shaped spring member 44 disposed between the large diameter cylindrical portion 37*a* of the coupling 37 and the joint sleeve 42, and a guide sleeve 46 disposed between the joint sleeve 42 and the spring member 44. FIG. 5 is an exploded view, partly in section, of the components of the buffer mechanism. The driven gear 26 and the spindle 30 correspond to the “rotary members” as referred to in this specification.

As shown in FIG. 2, a driving protrusion 48 protruding radially inwards is formed on the inner circumferential surface of the large diameter cylindrical portion 37*a* of the coupling 37 (See FIG. 5). As shown in FIG. 5, the joint sleeve 42 is made, for example, of metal, and formed to have a cylindrical configuration. The joint sleeve 42 is integrated with the spindle 30 by being relatively press-fitted thereinto (See FIGS. 2 through 4). Thus, the joint sleeve 42 constitutes a part of the spindle 30. Further, the joint sleeve 42 is accommodated in the large diameter cylindrical portion 37*a* of the coupling 37 so as to be capable of relative rotation. Formed on the outer circumferential surface of the joint sleeve 42 is a driven protrusion 50 protruding radially outwards. The driving protrusion 48 is adjacent to the driven protrusion 50 in the rotating direction thereof (See arrow Y in FIG. 2). The spring member 44 is made, for example, of metal, and is formed to have a C-shaped cylindrical configuration capable of elastic deformation in the radial direction, i.e., so-called flexural deformation (See FIG. 4). The spring member 44 is arranged so as to be loosely fitted into the large diameter cylindrical portion 37*a* of the coupling 37. Further, the driving protrusion 48 and the driven protrusion 50 are arranged so as to be loosely fitted into the opening of the spring member 44, i.e., into the space between opposite end surfaces thereof in the circumferential direction (See FIGS. 2 and 4). The spring member 44 corresponds to the “torque transmission member” as referred to in this specification.

Figure 6:
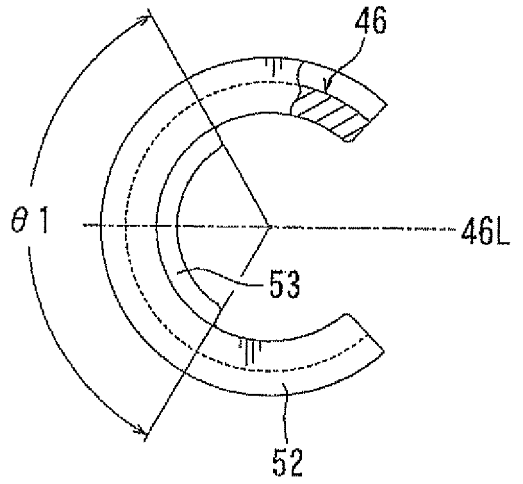
FIG. 6 A top view, partly in section, of a guide sleeve.

The guide sleeve 46 is made, for example, of synthetic resin, and is formed to, have a C-shaped cylindrical configuration. FIG. 6 is a top view, partly in section, of the guide sleeve. The guide sleeve 46 is interposed between the inner circumferential surface of the spring member 44 and the outer circumferential surface of the joint sleeve 42 opposed to that inner circumferential surface (See FIG. 4). In addition, the driving protrusion 48 and the driven protrusion 50 are arranged in a loosely fitted manner into the opening of the guide sleeve 46, i.e., between opposite end surfaces thereof in the circumferential direction. Further, at the upper end portion of the guide sleeve 46, a removal preventing flange 52 is formed to protrude radially outwards (See FIG. 5). The removal preventing flange 52 is situated on the spring member 44, preventing the spring member 44 from being removed.

Figure 7:
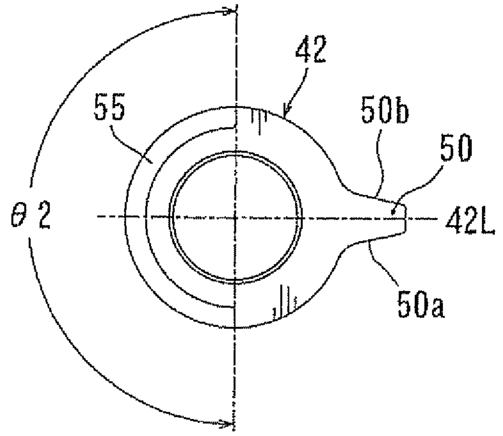
FIG. 7 A bottom view of a joint sleeve.

As shown in FIG. 5, at the lower end portion of the guide sleeve 46, an engaging flange 53 is formed to protrude radially inwards. On the other hand, at the lower end portion of the joint sleeve 42, a semi-arcuate engaging groove 55 corresponding to the engaging flange 53 is formed. FIG. 7 is a bottom view of the joint sleeve. Trough engagement of the engaging groove 55 with the engaging flange 53, the guide sleeve 46 is prevented from being removed (See FIG. 3). Thus, by press-fitting the joint sleeve 42 onto the spindle 30 in the state that the driven gear 26, the spring member 44, and the guide sleeve 46 are successively arranged in the bearing box 28 supporting the spindle 30, it is possible to easily mount the driven gear 26, the spring member 44, and the guide sleeve 46 to the bearing box 28 without need of any special component. An angular range θ1 (See FIG. 6) in which the engaging flange 53 is formed is set to be smaller than an angular range θ2 (See FIG. 7) in which the engaging groove 55 is formed. For example, the angular range θ1 is 120°, and the angular range θ2 is 180°. As a result, the joint sleeve 42 and the guide sleeve 46 are capable of relative rotation. The engaging flange 53 is formed to be in line symmetrical with respect to a straight line 46L extending in the radial direction of the guide sleeve 46 and passing the center of the opening (See FIG. 6). The engaging groove 55 is formed in line symmetrical with respect to a straight line 42L extending in the radial direction of the joint sleeve 42 and passing the center of the driven protrusion 50 (See FIG. 7). Since the guide sleeve 46 slidably contacts with the inner circumferential surface of the spring member 44 and the outer circumferential surface of the joint sleeve 42, the guide sleeve 46 is made of synthetic resin material having a low friction property, such as oil-impregnated resin material. The guide sleeve 46 corresponds to the "guide member" as referred to in this specification.

In the buffer mechanism 40, when the driven gear 26 is rotated to the right-hand turning direction (See the arrow Y in FIG. 4) in plan view via the gear 25 by starting the electric motor 16, one end of the spring member 44 is pressed by the driving protrusion 48 of the coupling 37, and torque is transmitted to the spindle 30 in the state that the other end of the spring member 44 is pressed against the driven protrusion 50 of the joint sleeve 42. In this situation, due to the load on the driven side (the rotational resistance of the grinding wheel 22, the spindle 30, the joint sleeve 42, etc.), the spring member 44 is flexed in the diameter enlarging direction, with the driven gear 26 and the spindle 30 being relatively offset with respect to the rotating direction. The elastic deformation amount (flexure amount) of the spring member 44 at this state corresponds to the magnitude of the driven side load. And, due to the elastic deformation of the spring member 44, the starting shock generated in the torque transmission system is mitigated. As a result, it is possible to improve the durability and feel of use of the electric disc grinder 10. For the sake of convenience in illustration, the end portion of the spring member 44 with which the driving protrusion 48 contacts is referred to as the "input end," and the end portion of the spring member 44 abutting the driven protrusion 50 is referred to as the "output end."

Figure 8:
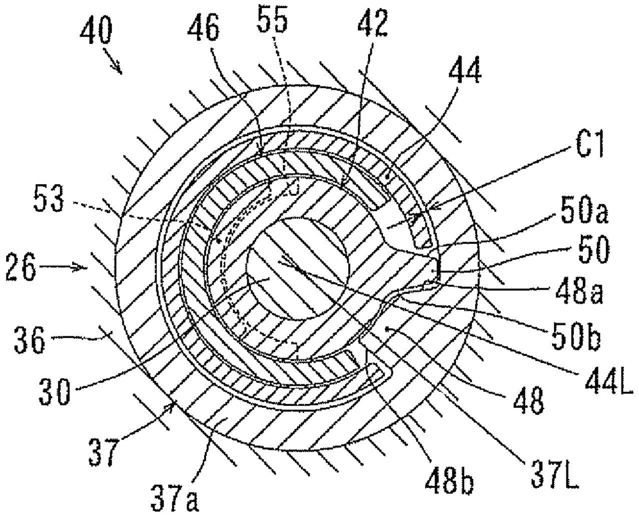
FIG. 8 A plan sectional view of the buffer mechanism in a non-loaded state.
Figure 9:
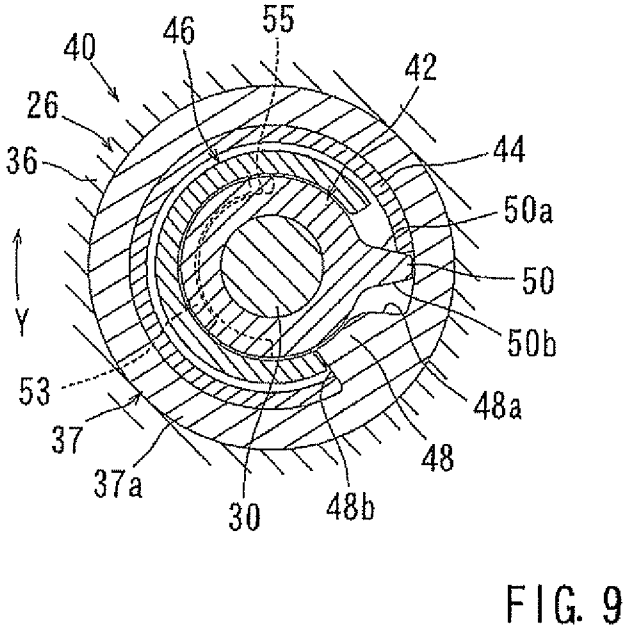
FIG. 9 A plan sectional view of the buffer mechanism in an overloaded state.

FIG. 8 is a plan sectional view of the buffer mechanism in the non-loaded state, and FIG. 9 is a plan sectional view of the same in the overloaded state. As shown in FIG. 9, during the elastic deformation of the spring member 44, the outer circumferential surface of the spring member 44 contacts in face-to-face with the inner circumferential surface of the large diameter cylindrical portion 37*a* of the coupling 37, whereby the maximum elastic deformation amount is determined. Further, as shown in FIG. 8, the size of a radial clearance C1 between the outer circumferential surface of the spring member 44 in the non-load state and the inner circumferential surface of the large diameter cylindrical portion 37*a* of the coupling 37 is set to 1 to 5% of the inner diameter of the large diameter cylindrical portion 37*a*. The outer circumferential surface of the spring member 44 corresponds to the "elastic-deformation-side circumferential surface" as referred to in this specification.

Figure 10:
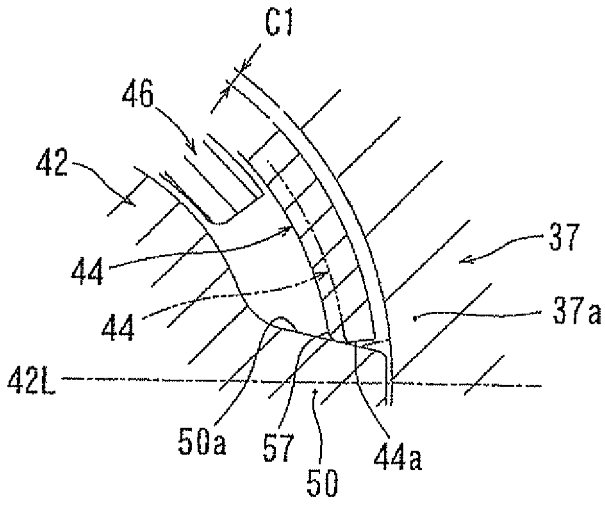
FIG. 10 An explanatory view illustrating the action of an abutment surface of the joint sleeve on an output end of a spring member.

FIG. 10 is an explanatory view illustrating the action of the abutment surface of the joint sleeve on the output end of the spring member. As shown in FIG. 10, the abutment surface 50*a* of the driven protrusion 50 of the joint sleeve 42 against the output end of the spring member 44 is formed as an inclined surface causing the output end of the spring member 44 to slide radially outwards. That is, the abutment surface 50*a* is inclined so as to gradually approach to the straight line 42L extending in the radial direction of the joint sleeve 42 and passing the center of the driven protrusion 50, along a direction from the base end of the driven protrusion 50 to the terminal end (the right end in FIG. 1). The abutment surface 50*b* of the driven protrusion 50 against the driving protrusion 48 (See FIG. 8) is formed as an inclined surface that is in line symmetrical with respect to the straight line 42L (See FIG. 7).

Figure 11:
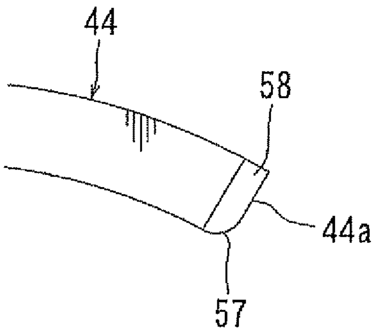
FIG. 11 A top view of the output end of the spring member.

As shown in FIG. 10, because the abutment surface 50*a* of the joint sleeve 42 is formed as an inclined surface, not the end surface in the circumferential direction (indicated by numeral 44*a*) at the output end of the spring member 44 but a corner portion formed by the end surface 44*a* and the inner circumferential surface abuts the abutment surface 50*a*. In view of this, rounding is performed on the corner portion to form a rounded surface 57. FIG. 11 is a top view of the output end of the spring member. Further, at the corner portions formed by the end surface 44*a* at the output end and opposite end surfaces in the axial direction (the upper end surface and the lower end surface), there are formed chamfered surfaces 58 through chamfering (See FIG. 5). Further, the spring member 44 is formed in line symmetrical with respect to a straight line 44L (See FIG. 8) extending in the radial direction and passing the center of the opening, and, also at the input end, there are formed a rounded surface 57 and chamfered surfaces 58 similar to those at the output end. Thus, the spring member 44 can be mounted to the interior of the large diameter cylindrical portion 37*a* of the coupling 37 regardless of whether it is directed upwardly or downwardly. Further, opposite end surfaces 44*a* in the circumferential direction of the spring member 44 are formed in planes orthogonal to the circumferential line. Further, as shown in FIG. 8, the abutment surface 48*a* of the driving protrusion 48 corresponding to the contact surface 50*b* of the driven protrusion 50 is formed as an inclined surface capable of contacting in face-to face with the abutment surface 50*a*. The abutment surface 48*b* of the driving protrusion 48 facing the input end of the spring member 44 is formed as a surface parallel to a straight line 37L extending in the radial direction of the large diameter cylindrical portion 37*a* of the coupling 37 and passing the driving protrusion 48.

The action of the abutment surface of the joint sleeve on the output end of the spring member 44 will be described. As described previously, at the start of the electric motor 16, the spring member 44 undergoes elastic deformation in the diameter enlarging direction between the driving protrusion 48 and the driven protrusion 50; however, the abutment surface 50*a* is formed as an inclined surface, so that when the rounded surface 57 at the output end of the spring member 44 comes into contact with the abutment surface 50*a* of the driven protrusion 50 (See the solid line in FIG. 10), the rounded surface 57 at the output end of the spring member 44 is caused to slide radially outwards (to the right in FIG. 10) on the abutment surface 50*a* (See the chain double-dashed line in FIG. 10). As a result, the spring member 44 easily undergoes elastic deformation in the diameter enlarging direction. Further, since the rounded surface 57 of the spring member 44 abuts the abutment surface 50*a* of the driven protrusion 50, it is possible to prevent the corner portion of the spring member 44 (the corner portion formed by the end surface 44*a* in the circumferential direction and the inner circumferential surface) from sharply abutting the abutment surface 50*a*, making it possible to prevent wear due to the sliding motion between them.

According to the electric disc grinder 10 described above, the abutment surface 50*a* is formed as an inclined surface, so that when the output end of the spring member 44 and the abutment surface 50*a* of the driven protrusion 50 of the joint sleeve 42 of the spindle 30 are brought into contact with each other, the output end of the spring member 44 is caused to slide radially outwards on the abutment surface 50*a* as stated above, whereby the spring member 44 easily undergoes elastic deformation in the diameter enlarging direction (See FIG. 10). Therefore, it is possible to mitigate the starting shock in a stable manner.

Further, the size of the radial clearance C1 (See FIG. 10) between the outer circumferential surface of the spring member 44 in the non-loaded state and the inner circumferential surface of the large diameter cylindrical portion 37*a* of the coupling 37 of the driven gear 26 facing the outer circumferential surface thereof is set to 1 to 5% of the inner diameter of the large diameter portion 37*a* of the coupling 37 of the driven gear 26. Therefore, it is possible to prevent deterioration in the durability of the spring member 44 due to excessive elastic deformation without impairing the starting shock mitigating effect given by the spring member 44. Incidentally, if the size of the clearance C1 is less than 1% of the inner diameter of the large diameter cylindrical portion 37*a*, the buffer effect given by the spring member 44 is impaired. If the size of the clearance C1 exceeds 5% of the inner diameter of the large diameter cylindrical portion 37*a*, the spring 44 undergoes excessive deformation, resulting in deterioration in durability. Therefore, by setting the size of the clearance C1 to 1 to 5% of the inner diameter of the large diameter cylindrical portion 37*a*, it is possible to prevent deterioration in the durability of the spring member 44 due to excessive elastic deformation without impairing the starting shock mitigating effect given by the spring member 44.

Further, due to the guide sleeve 46 disposed between the inner circumferential surface of the spring member 44 and the outer circumferential surface of the joint sleeve 42 facing that inner circumferential surface, it is possible to stabilize the position of the spring member 44 (See FIGS. 8 and 9). Further, since the guide sleeve 46 is made of synthetic resin material having a low friction property, it is possible to improve the sliding property for the sliding contact of the spring member 44 with the guide sleeve 46.

The present invention is not limited to the above-described embodiment but allows modification without departing from the gist of the present invention. For example, the present invention is applicable not only to the electric disc grinder 10 but also to other electric tools having a rotating end tool such as an electric screwdriver and an electric drill. Further, while in the embodiment described above the torque transmission member (the C-shaped spring member 44) transmits torque in one direction, it is also possible to adopt a torque transmission member transmitting torque in both normal and reverse directions. Further, the C-shape of the torque transmission member includes not only the shape of character C but also includes an arcuate or bow-shaped configuration, there being no restrictions in terms of arc length, curvature, etc. Further, in the above-described embodiment, because the spring member 44 undergoes elastic deformation in the diameter enlarging direction, the abutment surface 50*a* of the driven protrusion 50 is formed as an inclined surface causing the output end of the spring member 44 to slide radially outwards; however, if the spring member 44 is one undergoing elastic deformation in the diameter decreasing direction, the abutment surface 50*a* of the driven protrusion 50 may be formed as an inclined surface causing the output end of the spring member 44 to slide radially inwards. Also with the abutment surface 48*b* of the driving protrusion 48 of the coupling 37; if the spring member 44 is one undergoing elastic deformation in the diameter enlarging direction, the abutment surface thereof is formed as an inclined surface causing the input end of the spring member 44 to slide radially outwards; and, if the spring member 44 is one undergoing elastic deformation in the diameter decreasing direction, the abutment surface is formed as an inclined surface causing the input end of the spring member 44 to slide radially inwards. In addition, the driven gear 26 may be an integrally molded product that has a gear main body portion corresponding to the gear main body 36 and a coupling portion corresponding to the coupling 37. The material of the spring member 44 is not limited to metal but may be synthetic resin. Further, the assembling position of the spring member 44 is not limited to be between the driven gear 26 and the spindle 30 but is only necessary to be between two rotary members in the torque transmission system.

REFERENCE NUMERALS

10 . . . electric disc grinder (electric tool)
16 . . . electric motor
20 . . . power transmission device
25 . . . spindle (rotary member)
26 . . . driven gear (rotary member)
42 . . . joint sleeve
44 . . . spring member (torque transmission member)
46 . . . guide sleeve (guide member)
48 . . . driving protrusion
48*b* . . . abutment surface
50 . . . driven protrusion
50*a* . . . abutment surface

The invention claimed is:

1. An electric tool comprising:

a power transmission device configured to transmit torque of an electric motor to a driven object, the power transmission device having a C-shaped torque transmission member capable of radial elastic deformation and interposed, in a plane perpendicular to a rotational axis of two rotary members in a torque transmission system, between an inner circumferential surface of one of the two rotary members and an outer circumferential surface of the other of the rotary members, the torque transmission member being configured to transmit torque in a state (i) that one end thereof in a rotating direction contacts an abutment surface of the one rotary member and (ii) that the other end of the torque transmission member in the rotating direction contacts an abutment surface of the other rotary member, wherein, when the abutment surface of at least one of the rotary members contacts the corresponding end of the torque transmission member, the abutment surface is opposed to and inclined relative to an end surface of the corresponding end so that the corresponding end slides in a radial direction along the abutment surface.

2. The electric tool according to claim 1, wherein the size of a radial clearance between an elastic deformation side circumferential surface of the torque transmission member in a non-loaded state and the inner circumferential surface of the one rotary member opposed to the elastic deformation side circumferential surface is set to 1 to 5% of a diameter of the inner circumferential surface of the one rotary member.

3. The electric tool according to claim 2, wherein, between (i) a circumferential surface of the torque transmission member on the opposite side of the elastic deformation side circumferential surface thereof and (ii) the outer circumferential surface of the other rotary member opposed to the opposite side circumferential surface of the torque transmission member, there is provided a guide member that slidably contacts the respective circumferential surfaces and that is made of synthetic resin material.

4. The electric tool according to claim 1, wherein, between (i) a circumferential surface of the torque transmission member on the opposite side of an elastic deformation side circumferential surface thereof and (ii) the outer circumferential surface of the other rotary member opposed to the opposite side circumferential surface of the torque transmission member, there is provided a guide member that slidably contacts the respective circumferential surfaces and that is made of synthetic resin material.

5. The electric tool according to claim 1, wherein the abutment surface of the at least one rotary member is inclined relative to a radial direction of the at least one rotary member.

6. The electric tool according to claim 5, wherein the abutment surface of the at least one rotary member contacts only a corner portion of the corresponding end of the torque transmission member, the corner portion being located on a radially inner side or a radially outer side of the corresponding end.

7. The electric tool according to claim 6, wherein the corner portion is rounded.

8. The electric tool according to claim 1, wherein, between the C-shaped torque transmission member and the other rotary member, there is provided a C-shaped guide sleeve that is made of synthetic resin material and that slidably contacts the other rotary member and the torque transmission member.

9. The electric tool according to claim 1, wherein in the plane perpendicular to the rotational axis of the two rotary members, the other rotary member encircles the rotational axis.

10. The electric tool according to claim 9, wherein in the plane perpendicular to the rotational axis of the two rotary members, the one rotary member encircles the rotational axis.

11. The electric tool according to claim 10, wherein in the plane perpendicular to the rotational axis of the two rotary members, the other rotary member is closer to the rotational axis than the one rotary member.

12. An electric tool comprising:

a power transmission device configured to transmit torque of an electric motor to a driven object, the power transmission device having a C-shaped torque transmission member capable of radial elastic deformation and interposed between an inner circumferential surface of one of two rotary members in a torque transmission system and an outer circumferential surface of the other of the two rotary members, the torque transmission member being configured to transmit torque in a state (i) that one end thereof in a rotating direction contacts an abutment surface of the one rotary member and (ii) that the other end of the torque transmission member in the rotating direction contacts an abutment surface of the other rotary member, wherein:

when the abutment surface of at least one of the rotary members contacts the corresponding end of the torque transmission member, the abutment surface is opposed to and inclined relative to an end surface of the corresponding end so that the corresponding end slides in a radial direction along the abutment surface, and in a plane perpendicular to a rotational axis of the rotary members, the abutment surface of the at least one rotary member extends linearly.

13. The electric tool according to claim 12, wherein, between the C-shaped torque transmission member and the other rotary member, there is provided a C-shaped guide sleeve that is made of synthetic resin material and that slidably contacts the other rotary member and the torque transmission member.

14. The electric tool according to claim 12, wherein in the plane perpendicular to the rotational axis of the rotary members, the other rotary member encircles the rotational axis.

15. The electric tool according to claim 14, wherein in the plane perpendicular to the rotational axis of the rotary members, the one rotary member encircles the rotational axis.

16. The electric tool according to claim 15, wherein in the plane perpendicular to the rotational axis of the two rotary members, the other rotary member is closer to the rotational axis than the one rotary member.

17. An electric tool comprising:

a power transmission device configured to transmit torque of an electric motor to a driven object, the power transmission device having a C-shaped torque transmission member capable of radial elastic deformation and interposed between a drive side rotary member and a driven side rotary member in a torque transmission system, the torque transmission member being configured to transmit torque in a state (i) that one end thereof in a rotating direction contacts an abutment surface of the drive side rotary member and (ii) that the other end of the torque transmission member in the rotating direction contacts an abutment surface of the driven side rotary member, wherein:

the drive side rotary member includes a driving protrusion on its inner circumferential surface that projects radially inward, the driving protrusion forming the abutment surface of the drive side rotary member, the driven side rotary member includes a driven protrusion on its outer circumferential surface so that projects radially outward, the driven protrusion forming the abutment surface of the driven side rotary member, and when the abutment surface of at least one of the drive side and the driven side rotary members contacts the corresponding end of the torque transmission member, the abutment surface is opposed to and inclined relative to an end surface of the corresponding end so that the corresponding end slides in a radial direction along the abutment surface.

18. The electric tool according to claim 17, wherein the driving protrusion and the driven protrusion project in a plane that is perpendicular to a rotational axis of the drive side and the driven side rotary members and that intersects the abutment surfaces.

19. The electric tool according to claim 17, wherein, between the C-shaped torque transmission member and the driven side rotary member, there is provided a C-shaped guide sleeve that is made of synthetic resin material and that slidably contacts the driven side rotary member and the torque transmission member.

* * * * *